Dec. 4, 1962 T. A. SAULNIER, JR 3,067,055
METALLIZED PHOSPHOR SCREENS AND METHOD OF MAKING SAME
Filed Aug. 5, 1959
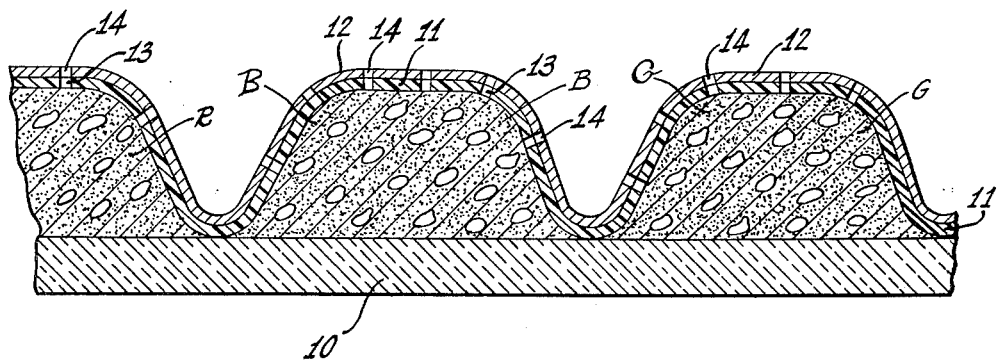
INVENTOR.
THEODORE A. SAULNIER, JR.
BY
William A. Zalesak
ATTORNEY

United States Patent Office 3,067,055
Patented Dec. 4, 1962

3,067,055
METALLIZED PHOSPHOR SCREENS AND METHOD OF MAKING SAME
Theodore A. Saulnier, Jr., Lancaster, Pa., assignor to Radio Corporation of America, a corporation of Delaware
Filed Aug. 5, 1959, Ser. No. 831,804
7 Claims. (Cl. 117—33.5)

This invention relates to the art of metallizing phosphor screens and has special reference to improvements in volatilizable substrates for the metal.

The electron-permeable, light reflecting, aluminum film on the target side of the phosphor screens of present-day television picture tubes is formed by evaporating the aluminum onto a smooth lacquer substrate, which substrate is subsequently volatilized and thereby removed from the underlying phosphor when the tube is "baked-out." In commercial production, such substrates have been formed of nitrocellulose or of resin materials dissolved in highly combustible solvents which are so hazardous to handle that their use is confined, usually by law, to fireproof rooms remote from the production line.

Accordingly, the principal object of the present invention is to provide substrate or "filming" materials and processes which shall obviate the above mentioned hazard of present-day methods of manufacturing metallized phosphor screens.

Another object of the invention is to provide substrate or filming materials which may be applied, as by spraying or other filming technique, to a phosphor screen without removing the tube from the tube-production line in the factory.

Another object of the invention is to provide a substrate which may be applied to the phosphor either when it is wet or when it is dry, and irrespective of whether the screen is of the "mosaic" (e.g., color-phosphor) variety or of the "continuous" (e.g., black-and-white) variety.

The foregoing and other objects and advantages are achieved, in accordance with the invention, by depositing the substrate upon the phosphor screen from a water based emulsion of a copolymer of an alkyl methacrylate and methacrylic acid such, for example, as a copolymer of ethyl methacrylate and methacrylic acid. Alternatively, the copolymer may consist essentially of one or more of methyl methacrylate, propyl methacrylate, and butyl methacrylate with methacrylic acid. Having regard to the desirability of salvaging imperfectly filmed screens, it is preferable to employ a polymer in which some of the ester groups of the polymer chain are replaced by acid groups, so that the film may be removed by redispersion with a solution of mild alkali, such as ammonium hydroxide, tetra sodium pyrophosphate, tri sodium phosphate, morpholine, etc.

The single FIGURE in the drawing is a fragmentary sectional view of an aluminized color television screen of the mosaic variety at one stage during its manufacture and made according to the invention.

Excellent results have been achieved with a resin emulsion comprising a copolymer of ethyl methacrylate and methacrylic acid dispersed in water with the aid of an anionic dispersing agent when making up the emulsion. Such emulsion has an acid number of 17 to 19 and an average particle size of 0.1 micron. The formulation, in one case, was:

Resins solids _____ 10% ±0.5%.
Plasticizer _____ 5% ±0.5% based on resin solids.
Water to make 100%.

The plasticizer used in the formula was dibutyl phthalate. It was added very slowly dropwise with rapid stirring directly to the resin emulsion; though the plasticizer may be made into an oil in water emulsion for easier addition. Other plasticizers (e.g., butyl phthalate, butyl glycolate, methyl phthalate, ethyl glycolate) may be used and, as brought out later on in this specification, blending with resins of different degrees of hardness is also practical.

The water based emulsion substrate of the invention may be applied to either a wet or a dry phosphor screen in any of several ways, e.g., (i) "spray," (ii) "housing," or (iii) "slurry, slosh and swirl." In the instance of applying a thin film over a phosphor screen, it is usually advantageous to apply a spinning motion to the phosphor screen during and after application of the emulsion in order to remove excess emulsion and level the emulsion. The speed of rotation can be varied between 30-70 r.p.m. to adjust the rate of emulsion draining to agree with the coating thickness desired, rate of drying and emulsion solids concentration applied.

Dry tri-color screens have been coated satisfactorily with resin emulsion dispersions having a resin content of 7.5 to 11%. Wet phosphor screens require slightly higher solids.

Wet phosphor screens are wet to the extent that the polyvinyl alcohol binder for the phosphor is fully swelled with water, but excess surface water is nearly all drained off by spinning. The lower the water content of the screen, the less the emulsion will be diluted. Accordingly, when coating wet phosphor screens, the resin solids should be adjusted, usually between 10 and 15% resin solids, to agree with the water drainage provided by the coating system being used. In the following example, the "slurry, slosh and swirl" technique was employed in applying the emulsion to a previously dried tri-color mosaic screen made up of tangent phosphor dots arranged in a hexagonal pattern, the phosphor coating comprising:

Blue emitting phosphor (zinc sulfide, silver activated) and polyvinyl alcohol weight, 1.1–1.88 milligrams/cm.$^2$ of which 14 to 16% by weight was PVA (polyvinyl alcohol).

Green emitting phosphor (zinc silicate, manganese activated) and PVA weight 1.40–1.8 mg./cm.$^2$ of which 14–17% was PVA.

Red emitting phosphor (zinc phosphate, manganese activated) and PVA weight 2.35–2.78 mg./cm.$^2$ of which 13–17% was PVA.

In the instant case the procedure was as follows:

(1) A 21", 19 lb. screened face-plate or "cap" of a color kinescope was placed, open-end up, upon an automatic slurry spinner, the cap being at room temperature (20–22° C.) The "slurry spinner" was similar to the one shown by Weingarten et al. in copending application Serial No. 605,780 (now U.S. P. 2,902,973), since the nonflammable nature of the emulsion or "slurry" permits the invention to be carried out on a factory conveyor system.

(2) Start slow rotation and slow tilting of the cap.

(3) A serving of 45–80 milliliters of emulsion was applied quickly to the center of the cap without causing foam.

(4) The emulsion puddle was spiraled over the screen area to the cap edge.

(5) The cap was tilted quickly to dump most of the excess slurry. The plane of the cap was tilted slightly (15–20°) beyond the vertical at this point.

(6) The speed of rotation was increased to 60–70 r.p.m.

(7) Radiant heat was applied to the spinning cap from a cluster of six figure-eight .375 watt Calrod heaters placed 8 to 10 inches from the screen.

(8) The heat was continued until the emulsion coating was dry.

(9) A jet of water was used to rinse the excess emulsion off the sidewalls of the faceplate panel during the drying cycle or before the emulsion set up to form a film.

(10) The dry emulsion coating was then aluminized, e.g., by thermal evaporation, in vacuo.

The amount of heat applied in drying the emulsion, and the exact percentage of plasticizer used may be said to control the porosity and profile of the film. The film should not have a very tight profile or too little porosity because such films will not out-gas during screen bake-out. A wrinkled or "too loose" a profile is not a likely condition to be encountered with emulsion films. However, too large a pore size and, indeed, random mosaic crazing, may occur if resins which have minimum film-forming temperatures above room temperature are employed. Should this crazing due to use of such resins occur, the temperature of the cap (and hence of the phosphor coating thereon) may be raised to the film-forming temperature of the resin prior to applying the emulsion, or more drying heat may be employed. Alternatively, more plasticizer may be employed to lower the film-forming temperature of the emulsion to correspond to the temperature of the substrate at the time the film is to be formed.

The exact amount of plasticizer may be varied over a wide range (0% to 10%, based on the resin solids) in order to obtain the desired film-forming properties. For example, no plasticizer at all need be employed if (a) the phosphor screen has been previously heated during screen drying, and (b) is at the film-forming temperature of about 35°–40° C. of the emulsion at the moment the water in the emulsion is reduced to the point where the film just starts to form. This last has been successful in factory production. As previously indicated, if the phosphor substrate cannot be brought to the film-forming temperature of the emulsion prior to or during the time the emulsion is being dried, sufficient plasticizer should be used to lower the film-forming temperature to correspond to the temperature of the substrate. It is possible to overheat the substrate. Temperatures in excess of 10° C. above the minimum film-forming temperature contribute to blistered film on screen bake-out and may lead to dull appearing films. In the extreme, the dull aluminum films can cause a loss in reflectivity which will cause a loss in light output from the phosphor screen.

Materials suitable for use in carrying the invention into effect are commercially available, in various degrees of hardness. When purchased in this form it is possible to mix two or more of the resins to provide water based emulsions having different minimum film-forming temperature, as desired.

The accompanying drawing is a fragmentary sectional view of an aluminized color-television screen of the mosaic variety at that stage of its manufacture immediately prior to "bake-out." Here the elementary dots (or lines) R (red), B (blue) and G (green) phosphor areas, of which the mosaic is comprised and formed on the face plate 10, still contain the light-sensitized "resist" (e.g., polyvinyl alcohol) employed in photographically laying down the pattern of the mosaic. This phosphor-containing pattern has been provided with a volatilizable substrate 11 for the specular, electron-pervious film of aluminum 12, the substrate 11 having been deposited on the phosphor-containing resist, in accordance with the invention, from a water based emulsion of a copolymer of an alkyl methacrylate and methacrylic acid. The substrate is porous. That is to say, it contains numerous holes, such as the holes 13, about the size of a pin-point, through which the gas given off in volatilizing the "resist" may escape. Holes 14 of similar size, in the aluminum film permit the escape of the gases evolved in vaporizing both the resist and the substrate at a screen bake-out temperature of 410–440° C. The maximum temperature of bake-out 440° C. is limited by the softening point of the glass substrate.

What is claimed is:

1. In that method of metallizing a cathode-ray tube screen which includes the steps of depositing a volatilizable substrate on said screen, evaporating the metal onto said substrate nad subsequently volatilizing said substrate, the improvement which comprises: depositing the volatilizable substrate on said screen from a water based emulsion consisting essentially of a copolymer of an alkyl methacrylate and methacrylic acid and then heating said layer near the film forming temperature of the discontinuous phase in said emulsion.

2. The invention as set forth in claim 1 and wherein said water based emulsion includes, as the plasticizer, one of the following, dibutyl phthalate, butyl phthalate, butyl glycolate, methyl phthalate, and ethyl glycolate.

3. In that method of metallizing a cathode-ray tube screen which includes the steps of depositing a volatilizable substrate on said screen, evaporating the metal onto said substrate and subsequently volatilizing said substrate, the improvement which comprises: depositing the volatilizable substrate on said screen from a water based emulsion consisting essentially of a copolymer of ethyl methacrylate and methacrylic acid and then heating said substrate near the film forming temperature of the discontinuous phase in the emulsion.

4. In that method of metallizing a cathode-ray tube screen which includes the steps of depositing a volatilizable substrate on said screen, evaporating the metal onto said substrate and subsequently volatilizing said substrate, the improvement which comprises: depositing the volatilizable substrate on said screen from a water based emulsion consisting essentially of a copolymer of methyl methacrylate and methacrylic acid and then heating said substrate near the film forming temperature of the discontinuous phase in said emulsion.

5. In that method of metallizing a cathode-ray tube screen which includes the steps of depositing a volatilizable substrate on said screen, evaporating the metal onto said substrate and subsequently volatilizing said substrate, the improvement which comprises: depositing the volatilizable substrate on said screen from a water based emulsion consisting essentially of a copolymer of propyl methacrylate and methacrylic acid and then heating said substrate near the film forming temperature of the discontinuous phase in said emulsion.

6. The method of metallizing a phosphor screen comprising applying to said screen a coating of an aqueous emulsion consisting essentially of (1) up to 15 weight percent of resin solids, said resin solids being composed of alkyl methacrylate and methacrylic acid and (2) 0 to 10 weight percent with respect to the weight of said resin solids of a plasticizer selected from the group consisting of dibutyl phthalate, butyl phthalate, butyl glycolate, methyl phthalate, and ethyl glycolate, heating said coating to temperatures near the film forming temperature of the combination of said resin solids and said plasticizer to dry said coating and to form a thin porous volatilizable substrate, evaporating a metal onto said substrate, and then volatilizing said substrate, said heating temperatures being below temperatures which produce blistering in said substrate during said volatilizing of said substrate.

7. The method of metallizing a phosphor screen comprising applying to said screen a coating of an aqueous emulsion consisting essentially of (1) up to 15 weight percent of resin solids, said resin solids being composed of a copolymer of alkyl methacrylate and methacrylic acid and (2) 0 to 10 weight percent with respect to the weight of said resin solids of a plasticizer selected from the group consisting of dibutyl phthalate, butyl phthalate, butyl glycolate, methyl phthalate, and ethyl glycolate, heating said coating to temperatures within 10° C. of the film forming temperature of the combination of said resin solids and said plasticizer to dry said coating and to form a thin porous volatilizable substrate, evaporating a metal onto said substrate, and then volatilizing said substrate.

(References on following page)

References Cited in the file of this patent

UNITED STATES PATENTS

| | | |
|---|---|---|
| 2,297,048 | Britten et al. | Sept. 29, 1942 |
| 2,644,770 | Sadowsky | July 7, 1953 |
| 2,792,315 | Levy | May 14, 1957 |
| 2,888,361 | Curry | May 26, 1959 |
| 2,905,571 | Seats et al. | Sept. 22, 1959 |
| 2,910,376 | Stankey et al. | Oct. 27, 1959 |

FOREIGN PATENTS

| | | |
|---|---|---|
| 150,970 | Australia | Dec. 22, 1949 |